Patented Jan. 9, 1923.

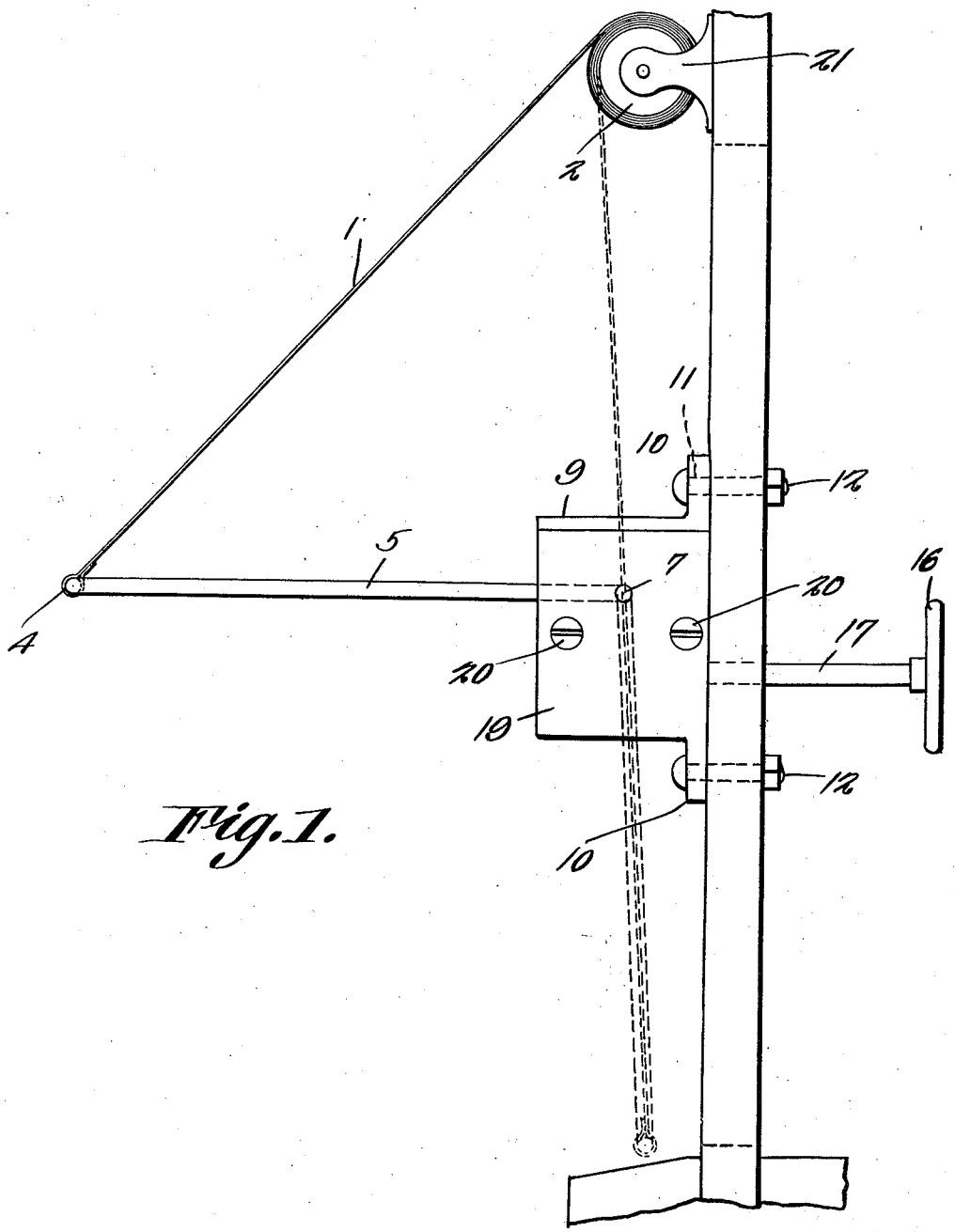

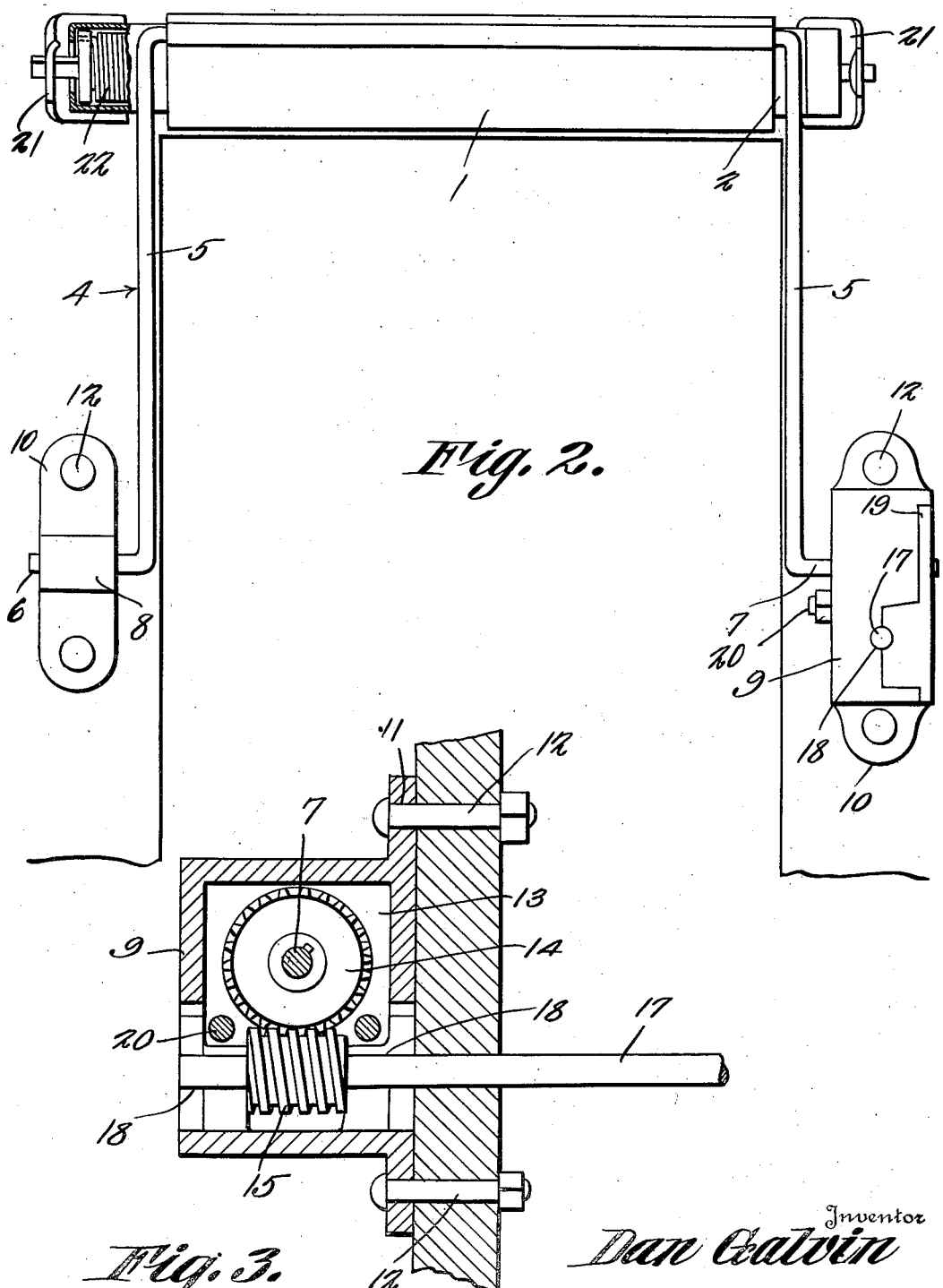

1,441,495

UNITED STATES PATENT OFFICE.

DAN GALVIN, OF PADUCAH, KENTUCKY.

SUNSHADE DEVICE.

Application filed October 21, 1921. Serial No. 509,377.

*To all whom it may concern:*

Be it known that I, DAN GALVIN, a citizen of the United States, residing at Paducah, in the county of McCracken and State of Kentucky, have invented a new and useful Sunshade Device, of which the following is a specification.

This invention relates to sun shades and has for its object the provision of a simple and inexpensive device whereby a shade may be attached to the outside of a window and raised or lowered from the inside of the window. It being also adapted for use as a sun visor on the windshield of an automobile.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention or sacrificing any of the advantages thereof.

In the accompanying drawings:

Figure 1 shows in side elevation a shade constructed in accordance with this invention.

Figure 2 is a view in elevation as seen from the front of the device, and

Figure 3 is a detail sectional view of the operating mechanism.

Referring to the drawings by characters of reference, the numeral 1 denotes a curtain, which is secured at one end to a roll 2 the other end of the curtain is secured to a U-shaped support or yoke 4, the arms 5 of which space the lower end of the curtain from the window opening. The arms 5 are provided with pintles 6 and 7 which are mounted for oscillation in bearing blocks 8 and 9 respectively, the blocks each having ears 10 supplied with openings 11 adapted to receive securing elements 12 whereby the blocks may be attached to the outer surface of the window casing or the supports of an automobile wind shield as the case may be.

The block 9 is provided with a depression 13 in which is mounted means for operating the support 4. The said means constituting a worm gear 14, which is keyed fast to the pintle 7, a worm wheel 15 cooperates with the gear 14 to rotate the same, the worm being manipulated by means of a hand wheel 16, located inside the window casing, within easy reach of a person on the inside. The hand wheel 16 is mounted on a shaft 17 which has bearings 18 in the block 9, said shaft also carries the worm 15. A cover plate 19 is secured to the block 9 by means of screws 20 and effectively houses the operating mechanism.

The roller 2 to which the upper end of the curtain is secured is mounted for rotation in brackets 21 and is provided with a spring 22 for maintaining constant tension on the curtain.

It will be observed that the curtain may be lowered to shade such portion of the window as desired, the spring roller keeping the curtain material tightly stretched and the worm wheel and gear holding the curtain, without pawl or ratchet, against the tension of the spring roller.

Having thus described the invention, what is claimed is:

A device of the class described comprising a support; bearings mounted on the support, one of the bearings being of box-like form; a U-shaped yoke including arms having outwardly extended pintles which are journaled in the bearings; a roller journaled on the support; a curtain wound about the roller and connected to the intermediate portion of the yoke, the pintles serving to space the arms from the inner surface of the bearings, and the arms operating between the longitudinal edges of the curtain and the inner surfaces of the bearings, whereby when the curtain is carried downwardly with the yoke, the curtain will clear the bearings; a gear wheel on one pintle and housed completely within the box-like bearing, the gear wheel having a full circle of teeth whereby the yoke may be swung through a half circle; a shaft journaled in the box-like bearing, and a worm on the shaft for rotating the gear wheel, the worm being likewise completely housed within the said bearing.

In testimony that I claim the foregoing as my own, I have hereto affixed my signature in the presence of two witnesses.

DAN GALVIN.

Witnesses:
 AGNES FLYNN,
 HUGH ELDER.